(12) United States Patent
Wu et al.

(10) Patent No.: US 10,618,677 B1
(45) Date of Patent: Apr. 14, 2020

(54) ARTICULATING SUNSHIELD

(71) Applicant: Space Systems/Loral, LLC, Palo Alto, CA (US)

(72) Inventors: Gordon Wu, Sunnyvale, CA (US); David Marlow, Redwood City, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 318 days.

(21) Appl. No.: 15/586,076

(22) Filed: May 3, 2017

(51) Int. Cl.
*B64G 1/58* (2006.01)
*B64G 1/22* (2006.01)
*B64G 1/54* (2006.01)
*B64G 1/44* (2006.01)

(52) U.S. Cl.
CPC ............... *B64G 1/222* (2013.01); *B64G 1/44* (2013.01); *B64G 1/546* (2013.01); *B64G 1/58* (2013.01)

(58) Field of Classification Search
CPC .......... B64G 1/222; B64G 1/546; B64G 1/58
USPC ........................................................ 244/171
See application file for complete search history.

(56) References Cited

U.S. PATENT DOCUMENTS

| | | | |
|---|---|---|---|
| 6,102,339 A | 8/2000 | Wu et al. | |
| 6,199,988 B1 | 3/2001 | Krawczyk | |
| 6,219,185 B1* | 4/2001 | Hyde | B64G 1/105 244/3.16 |
| 6,481,671 B1 | 11/2002 | Blair | |
| 2016/0114909 A1* | 4/2016 | Walker | B64G 1/222 244/158.5 |
| 2016/0311561 A1* | 10/2016 | Lemaire | B64G 1/44 |
| 2016/0380486 A1* | 12/2016 | Hajimiri | B64G 1/44 307/104 |

FOREIGN PATENT DOCUMENTS

| | | |
|---|---|---|
| FR | 2902764 B1 | 9/2009 |
| RU | 2089467 C1 | 9/1997 |
| WO | WO 2000/005134 A9 | 8/2002 |
| WO | WO 2007/048161 A1 | 5/2007 |

OTHER PUBLICATIONS

Hamilton, Spacecraft Deep Impact (Courtesy NASA), 1997-2009, Views of the Solar System, pp. 1-2, http://solarviews.com/eng/deepimpact.htm (Year: 2009).*

* cited by examiner

*Primary Examiner* — Nicholas McFall
*Assistant Examiner* — Terri L Filosi
(74) *Attorney, Agent, or Firm* — Weaver Austin Villenueve & Sampson LLP

(57) ABSTRACT

Techniques for articulating a sunshield to shade portions of a spacecraft are disclosed. In one aspect, a spacecraft includes a body and an articulable sunshield. The spacecraft is configured to operate in an orbital plane, such that the spacecraft has a yaw axis within the orbital plane and directed from a spacecraft coordinate system origin toward nadir, a pitch axis orthogonal to the orbital plane and passing through the spacecraft coordinate system origin, and a roll axis orthogonal to the pitch axis and the yaw axis and passing through the spacecraft coordinate system origin. The sunshield is configured to rotate about an axis substantially parallel to the pitch axis such that a selected location of an exterior portion of the body is shaded from the Sun by a surface of the sunshield irrespective of seasonal and diurnal variations in orientation of the spacecraft with respect to the Sun.

13 Claims, 8 Drawing Sheets

ARTICULATING SUNSHIELD

TECHNICAL FIELD

This invention relates generally to a sunshield of a spacecraft, and more particularly to techniques for articulating a sunshield to shade portions of a spacecraft.

BACKGROUND

The assignee of the present invention designs and manufactures spacecraft for, inter alia, a variety of services from geosynchronous orbit. Some payloads of such spacecraft have temperature-sensitive components with stringent thermal requirements. By way of example, an infrared imager of a spacecraft that includes a meteorological payload may require to be maintained at cryogenic temperatures in order to reduce noise in image production. Referring to FIG. 1A, a 3-axis stabilized spacecraft 100 may be regarded as including a main body 110 enclosed by sidewalls facing, respectively in a north, south, east, west, Earth (nadir) and anti-Earth (zenith) direction. When the 3-axis stabilized spacecraft is operating on-orbit, an earth facing imager 120 may be thermally coupled with a north (or south) facing radiator 125. As a result of being oriented to face north (or south) the radiator 125 has limited exposure to the Sun and may efficiently radiate heat into space. Nevertheless, the radiator is exposed to seasonally and diurnally varying thermal loads from the Sun and/or backload from solar arrays of the spacecraft, which may result in higher than desired temperatures.

In a conventional spacecraft, exposure of a temperature-sensitive component to solar radiation and/or backload from solar arrays may be reduced by a seasonal yaw flip strategy, e.g., twice per year flipping the spacecraft 180 degrees, such that radiator exposure to direct solar loads is avoided. The yaw flip strategy may cause the radiator to be north facing from late September to late March (from the autumnal equinox to the vernal equinox) and cause the radiator to be south facing from late March to late September (from the vernal equinox to the autumnal equinox). However, a seasonal yaw flip strategy is not acceptable for many payloads because placement of many components, such as antennae, is often asymmetrical. Therefore, yaw flip may result in unacceptable changes to antenna coverage patterns on the ground.

To avoid thermal backload from a solar array onto the radiator of meteorological payloads, some conventional spacecraft, e.g., as spacecraft 150 of FIG. 1B, have avoided disposing a solar array in view of a radiator, e.g., radiator 154 of the spacecraft 150. For example, the spacecraft 150 includes a specially designed solar sail 152 that has been provided in lieu of an omitted solar array to provide balanced solar torque. The solar sail 152 can be sized and placed to balance the torque arising from solar pressure on the single solar array 156. However, the solar sail 152 adds deadweight to the spacecraft 150 without providing any added capabilities.

Accordingly, in the absence of the present teachings, spacecraft carrying payloads having temperature-sensitive components must often be built with significant design constraints.

SUMMARY OF INVENTION

The systems, apparatuses, and spacecraft disclosed herein have several innovative aspects, no single one of which is solely responsible for the desirable attributes disclosed herein.

One innovative aspect of the subject matter described in this disclosure can be implemented in a spacecraft comprising a body and an articulable sunshield. The spacecraft may be configured to operate in an orbital plane of a geosynchronous orbit of Earth, such that the spacecraft has a yaw axis within the orbital plane and directed from a spacecraft coordinate system origin toward nadir, a pitch axis orthogonal to the orbital plane and passing through the spacecraft coordinate system origin, and a roll axis orthogonal to the pitch axis and the yaw axis and passing through the spacecraft coordinate system origin. The sunshield may be configured to rotate about an axis substantially parallel to the pitch axis such that a selected location of an exterior portion of the body is shaded from the Sun by a surface of the sunshield irrespective of seasonal and diurnal variations in orientation of the spacecraft with respect to the Sun.

In some implementations, the sunshield may be mechanically coupled with a counterweight that rotates with the sunshield such that a center of gravity of the spacecraft remains substantially constant during rotation of the sunshield.

In some implementations, the sunshield may be configured to be reconfigurable from a launch configuration to an on-orbit configuration. In the launch configuration, the surface of the sunshield may be substantially parallel to a sidewall of the body. In the on-orbit configuration, the surface of the sunshield may be substantially orthogonal to the sidewall of the body.

In some implementations, the selected location may include a radiator of an infra-red imager.

In some implementations the selected location may include a low noise amplifier (LNA).

In some implementations, the spacecraft may further comprise a plurality of solar arrays.

In some implementations, each solar array may include 6 panels, the selected location may be disposed on a north-facing or south-facing sidewall of the body, and a maximum daily thermal load absorbed by the selected location may not exceed 95 Watts per meter squared.

Another innovative aspect of the subject matter described in this disclosure can be implemented in a system comprising an articulable sunshield coupled with a body of a spacecraft. The spacecraft may be configured to operate in an orbital plane of a geosynchronous orbit of Earth, such that the spacecraft has a yaw axis within the orbital plane and directed from a spacecraft coordinate system origin toward nadir, a pitch axis orthogonal to the orbital plane and passing through the spacecraft coordinate system origin, and a roll axis orthogonal to the pitch axis and the yaw axis and passing through the spacecraft coordinate system origin. The system may also comprise a controller. The controller may be configured to provide control signals to cause rotating the sunshield about an axis substantially parallel to the pitch axis such that a selected location of an exterior portion of the body is shaded from the Sun by a surface of the sunshield irrespective of seasonal and diurnal variations in orientation of the spacecraft with respect to the Sun.

In some implementations the sunshield may be mechanically coupled with a counterweight that rotates with the sunshield such that a center of gravity of the spacecraft remains substantially constant during rotation of the sunshield.

In some implementations the controller may be further configured to provide control signals to cause transitioning the sunshield from a launch configuration to an on-orbit configuration. In the launch configuration, the surface of the sunshield may be substantially parallel to a sidewall of the body. In the on-orbit configuration, the surface of the sunshield may be substantially orthogonal to the sidewall of the body.

In some implementations, the selected location may include a radiator of an infra-red imager.

In some implementations the selected location may include a low noise amplifier (LNA).

In some implementations, the spacecraft may further comprise a plurality of solar arrays.

In some implementations, each solar array may include 6 panels, the selected location may be disposed on a north-facing or south-facing sidewall of the body, and a maximum daily thermal load absorbed by the selected location may not exceed 95 Watts per meter squared.

Another innovative aspect of the subject matter described in this disclosure can be implemented in a method comprising deploying a sunshield of a spacecraft operating in an orbital plane of a geosynchronous orbit of Earth, such that the spacecraft has a yaw axis within the orbital plane and directed from a spacecraft coordinate system origin toward nadir, a pitch axis orthogonal to the orbital plane and passing through the spacecraft coordinate system origin, and a roll axis orthogonal to the pitch axis and the yaw axis and passing through the spacecraft coordinate system origin; and rotating the sunshield about an axis substantially parallel to the pitch axis such that a selected location of an exterior portion of a body of the spacecraft is shaded from the Sun by a surface of the sunshield irrespective of seasonal and diurnal variations in orientation of the spacecraft with respect to the Sun.

In some implementations, the sunshield may be mechanically coupled with a counterweight configured to translate during rotation of the sunshield such that a center of gravity of the spacecraft remains substantially constant during rotation of the sunshield.

In some implementations, deploying the sunshield may include transitioning the sunshield from a launch configuration to an on-orbit configuration. In the launch configuration, the surface of the sunshield may be substantially parallel to a sidewall of the body. In the on-orbit configuration, the surface of the sunshield may be substantially orthogonal to the sidewall of the body. In some implementations, the selected location may include a radiator of an infra-red imager.

In some implementations the selected location may include a low noise amplifier (LNA).

In some implementations, the spacecraft may further comprise a plurality of solar arrays.

In some implementations, each solar array may include 6 panels, the selected location may be disposed on a north-facing or south-facing sidewall of the body, and a maximum daily thermal load absorbed by the selected location may not exceed 95 Watts per meter squared.

BRIEF DESCRIPTION OF THE DRAWINGS

Features of the invention are more fully disclosed in the following detailed description of the preferred embodiments, reference being had to the accompanying drawings, in which.

Figure 1A:
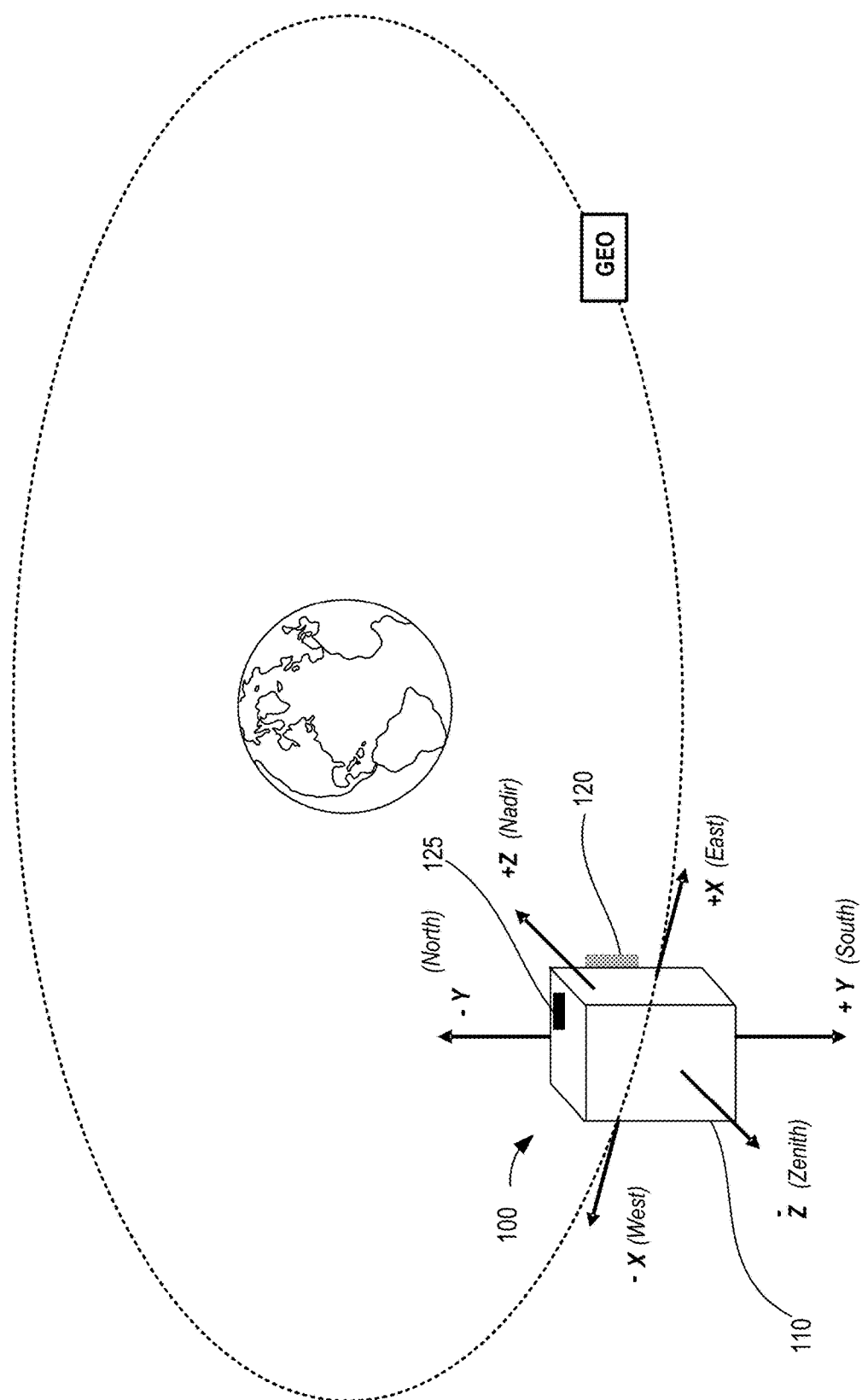
FIG. 1A illustrates simplified diagram of an example of a spacecraft orbiting Earth, in accordance with some implementations.
Figure 1B:
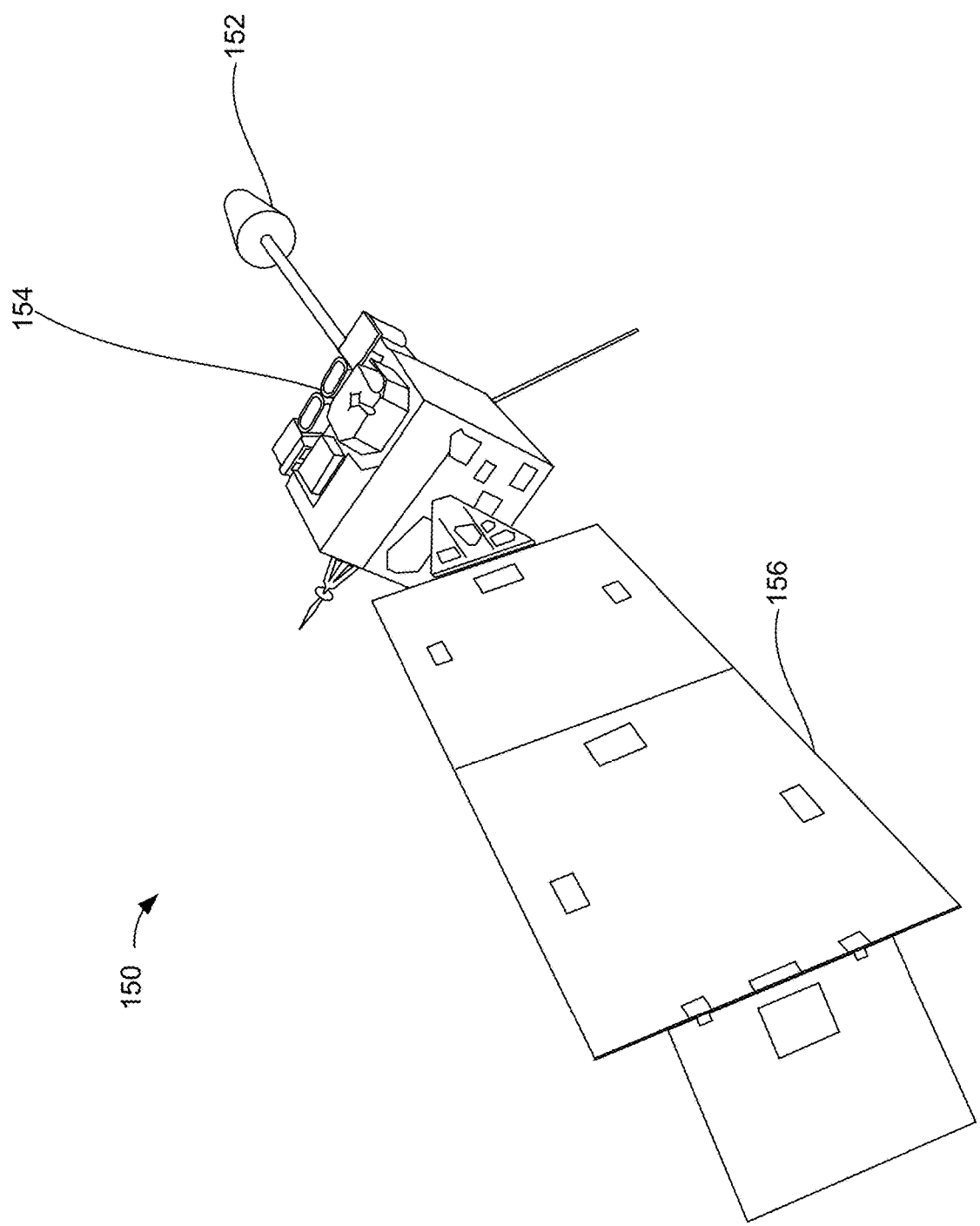
FIG. 1B illustrates an example of an isometric view of a conventional spacecraft of the prior art.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

The phrase "substantially parallel" as used herein, unless otherwise expressly indicated, refers to a relationship in which a plane or generally flat part or surface is either parallel to, or at a minimum angle close to 0° with respect to, a reference axis. A plane which is substantially parallel to an axis may be, for example, at as much as approximately an 10° maximum angle with respect to the axis and still be considered to be substantially parallel. The terms "parallel" and "substantially parallel" may be used interchangeably herein.

The phrase "substantially orthogonal" as used herein, unless otherwise expressly indicated, refers to a relationship in which a plane or generally flat part or surface is either orthogonal to, or at a minimum angle close to 90° with respect to, a reference axis. A plane which is substantially orthogonal to an axis may be, for example, at as much as approximately an 80° minimum angle with respect to the axis and still be considered to be substantially orthogonal. The terms "orthogonal" and "substantially orthogonal" may be used interchangeably herein.

Embodiments disclosed hereinbelow allow for a reduction of the solar load on a temperature-sensitive component (and/or a radiator thermally coupled with the temperature-sensitive component) by blocking the component (and/or radiator) from solar exposure using a sunshield. Such a reduction of solar load eliminates the need to perform a seasonal yaw flip or to include a specially designed solar sail, as discussed above.

Figure 2:
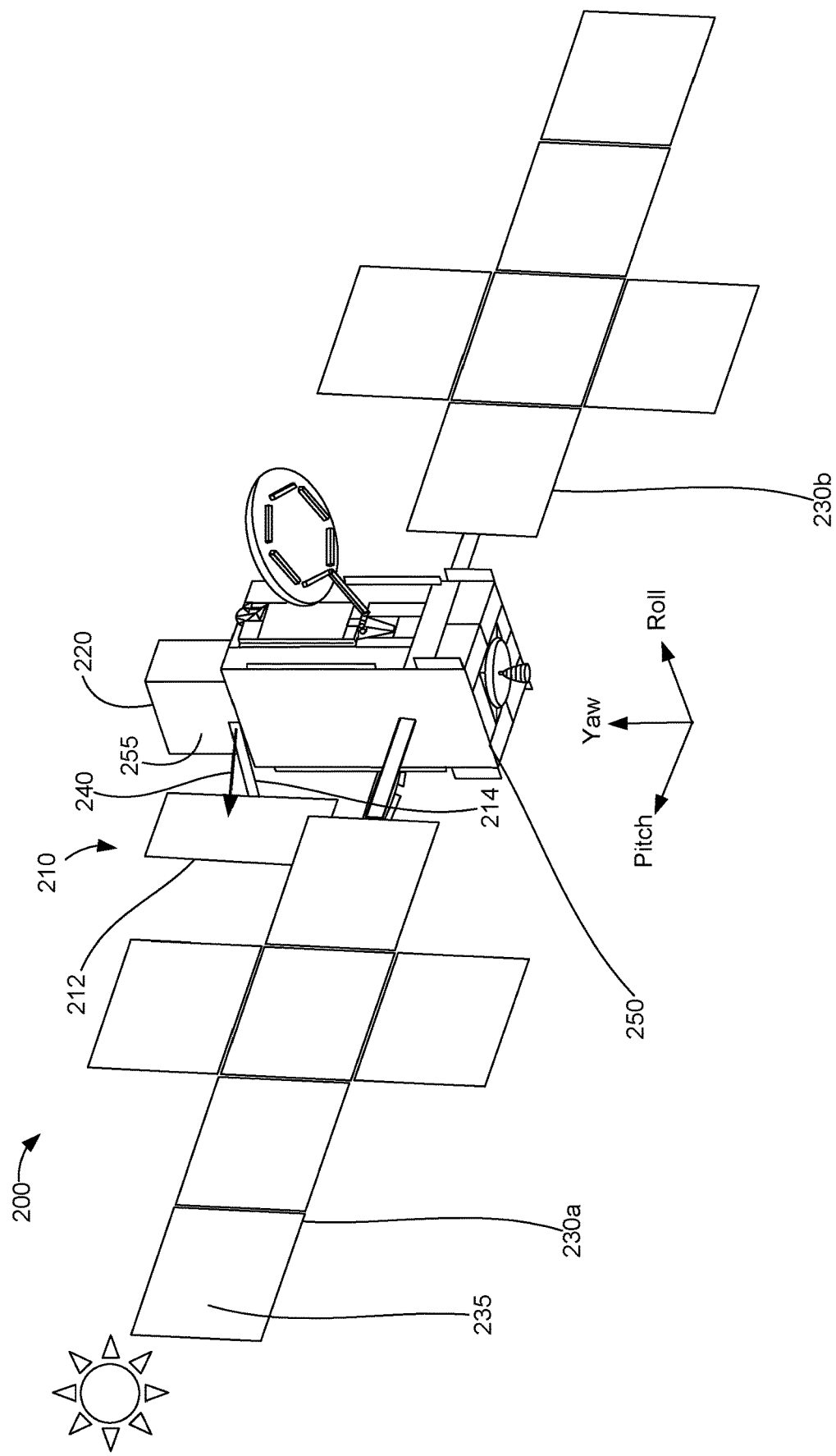
FIG. 2 illustrates an example of an isometric view of a spacecraft, in accordance with some implementations.

For example, FIG. 2 shows an isometric view of a spacecraft 200 with a sunshield 210, an imager radiator 220, and two solar arrays 230a and 230b. Like the spacecraft of FIG. 1A, the spacecraft of FIG. 2 is configured to operate in an orbital plane of a geosynchronous orbit of Earth, such that the spacecraft has a yaw axis within the orbital plane and directed from a spacecraft coordinate system origin toward nadir, a pitch axis orthogonal to the orbital plane and passing through the spacecraft coordinate system origin, and a roll axis orthogonal to the pitch axis and the yaw axis and passing through the spacecraft coordinate system origin. Consistent with the above described coordinate system, imager optics (not shown) may be oriented toward earth (coincident with or parallel to the yaw axis). An exposed radiating surface of the imager radiator 220, may be disposed in an exterior portion 255 of spacecraft body 250 so as to face north or south in a direction parallel to the pitch axis.

As depicted in FIG. 2, the sunshield 210 includes an opaque or diffused surface 212 rotatably coupled with spacecraft 200 by an arm (or "boom") 214. The surface 212 may be positioned to block a path between the Sun and all or a selected region or location of exterior portion 255. Accordingly, exposure of the radiating surface of the imager radiator 220 to solar radiation may be substantially reduced by the sunshield 210.

Throughout a given day the sunshield 210 may be articulated to track the Sun, continuing to block solar radiation (and/or backload from the solar arrays 230a and 230b) from reaching the radiating surface of the imager radiator 220, irrespective of seasonal and diurnal variations in orientation of the spacecraft with respect to the Sun. By way of example, a rotation driving mechanism may drive the sunshield 210 to rotate such that the surface 212 of the sunshield 210 continually faces the Sun throughout the day, thereby blocking much of the thermal load from the Sun and solar arrays 230a and 230b from reaching the radiating surface of the imager radiator 220.

By way of example, the sunshield 210 may be configured to rotate about an axis 240, which is substantially parallel to the pitch axis. As an orientation of the spacecraft 200 with respect to the Sun changes, the surface 212 of the sunshield 210 is rotated so as to substantially shade a portion of the body 250 (e.g. portion 255, which contains the radiating surface of the imager radiator 220) from the Sun irrespective of seasonal and diurnal variations in orientation of the spacecraft 200 with respect to the Sun.

Figure 3:
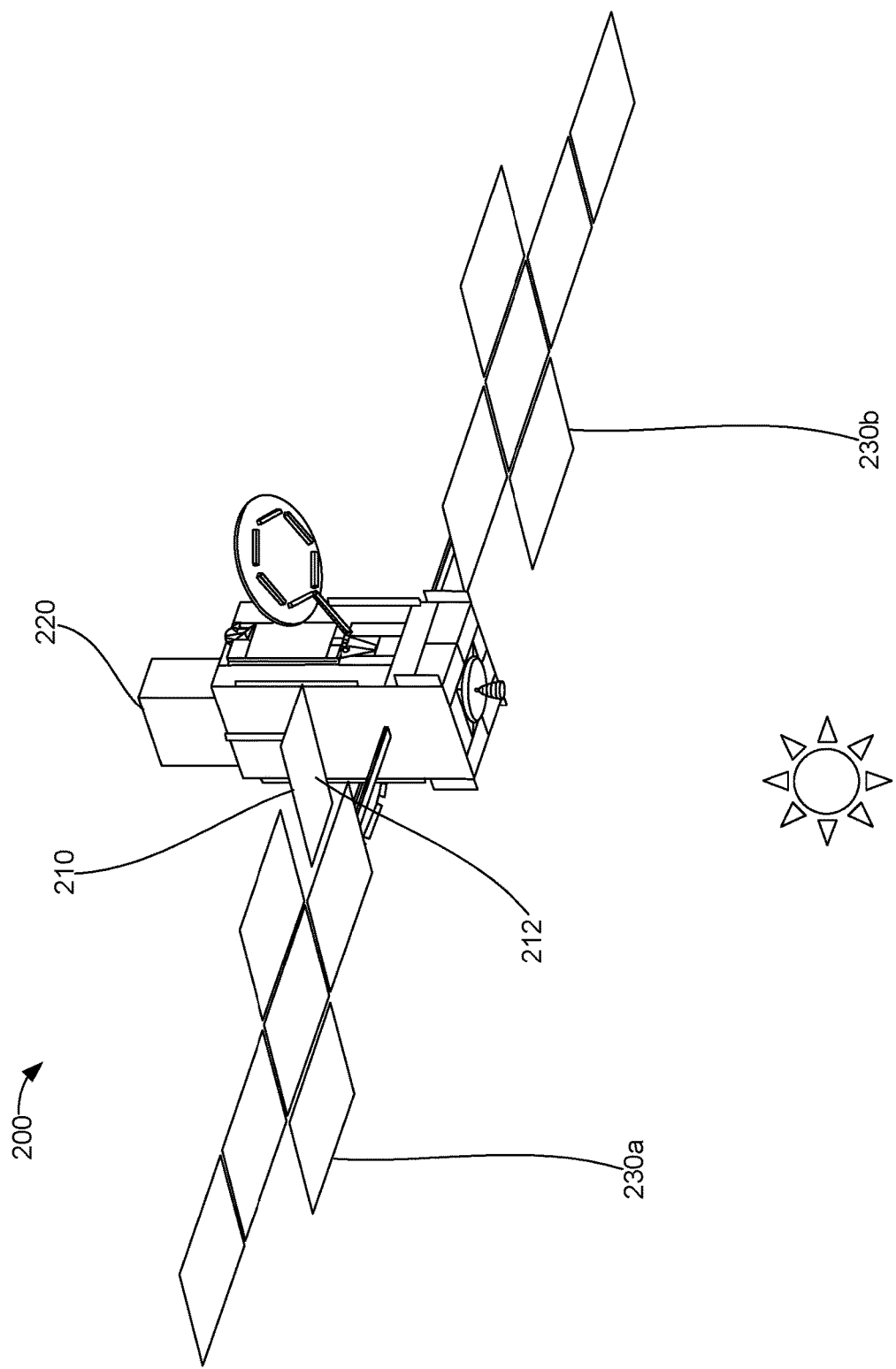
FIG. 3 illustrates an example of an isometric view of a spacecraft, in accordance with some implementations.

For example, the rotation driving mechanism discussed above can drive the sunshield 210 from the position depicted in FIG. 2 to the position depicted in FIG. 3 as the Sun's relative position changes from that depicted in FIG. 2 to that depicted in FIG. 3. As depicted in FIG. 3, the sunshield 210 is positioned to block both the path between the Sun and the radiating surface of the imager radiator 220 and the path between the solar array 230a and the radiating surface of the imager radiator 220. Accordingly, the exposure of the radiating surface of the imager radiator 220 to solar radiation and the backload from the solar array 230a is reduced by the sunshield 210.

Figure 4A:
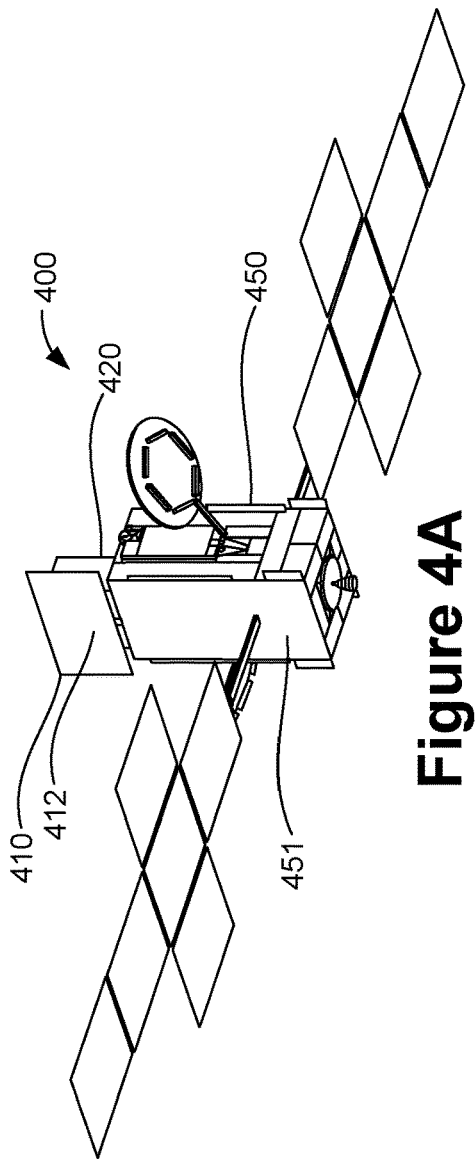
FIG. 4A illustrates an example of an isometric view of a spacecraft, in accordance with some implementations.
Figure 4B:
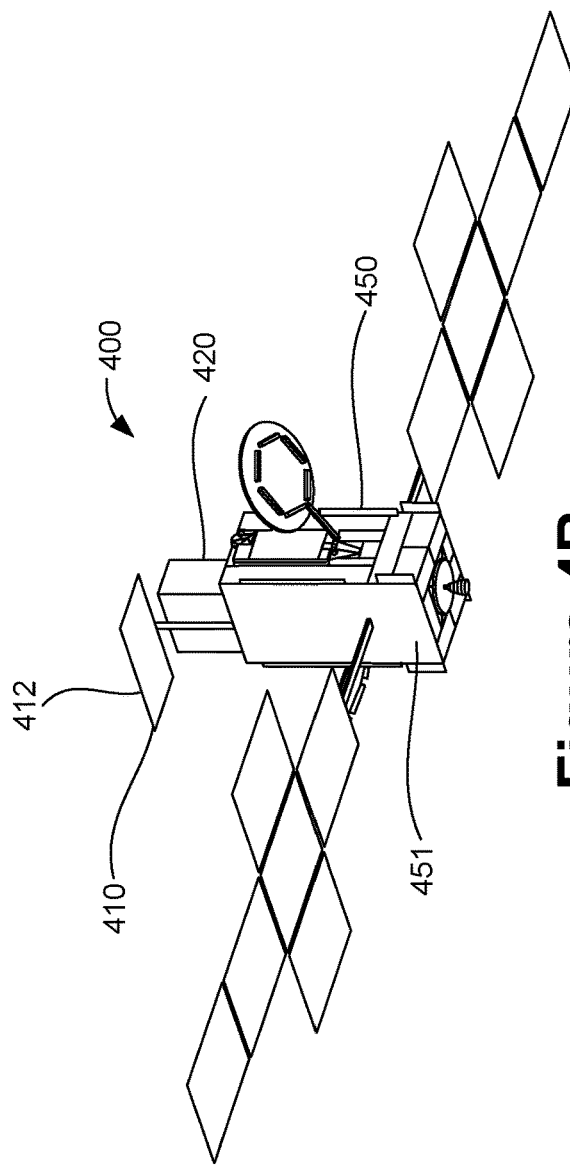
FIG. 4B illustrates an example of an isometric view of a spacecraft, in accordance with some implementations.

In some implementations, a sunshield may have several configurations. For example, FIGS. 4A and 4B illustrate isometric views of examples of a spacecraft 400, in accordance with some implementations. In FIG. 4A prior to launch, when the spacecraft 400 is in a launch configuration, a sunshield 410 may be disposed as compactly as possible adjacent to imager radiator 420. Once the spacecraft has entered orbit, a hinge mechanism may cause the sunshield 410 to rotate until the sunshield reaches the on-orbit configuration depicted in FIG. 4B. In the launch configuration, the surface 412 of the sunshield 410 is substantially parallel to sidewall 451 of the body 450 of the spacecraft 400, and in the on-orbit configuration, the surface 412 of the sunshield 410 is substantially orthogonal to the sidewall 451 of the body 450 of the spacecraft 400. In the on-orbit configuration, the sunshield 410 may rotate as described above in the context of FIGS. 2 and 3.

It will be appreciated that the approach disclosed herein is broadly applicable and is not limited to the embodiments depicted in FIGS. 2-4B. For example, the size, shape, and placement of a sunshield (e.g., the sunshield 210 of FIG. 2) the length of a boom supporting a sunshield (e.g., boom 214 of FIG. 2) and the placement of the motor driving rotation of the sunshield (not depicted) may vary depending on the size or shape of a spacecraft and/or the size, shape, or placement of a temperature sensitive component such as the radiating surface of the imager radiator 220 of FIG. 2.

Additionally, the disclosed techniques may be implemented to reduce thermal load on a temperature sensitive component to a varying level based on differing features of a spacecraft. By way of example, in FIG. 2, the spacecraft 200 includes two solar arrays 230a and 230b each of which includes six panels 235. As discussed below, in the context of FIG. 5, a maximum daily thermal load absorbed by the radiating surface of the imager radiator 220 of FIG. 2 from the Sun does not exceed 95 Watts per meter squared.

In some implementations, steps may be taken to minimize the effects of a sunshield on the operation of a spacecraft. For example, rotation of the sunshield 210 of FIGS. 2 and 3 may results in a change in the center of gravity of the spacecraft 200, causing the spacecraft 200 to wobble. However, corrective measures may be applied to mitigate such wobbling. By way of example, the sunshield 210 may be mechanically coupled with a counterweight (not depicted). As the sunshield 210 rotates, the counterweight can oppose the rotation of the sunshield 210 such that the center of gravity of the spacecraft 200 remains substantially constant during rotation of the sunshield. Also, or alternatively, the sunshield 210 can be designed to be sufficiently compact so as to not cast a shadow on the solar arrays 230a and 230b of the spacecraft 200 at any point during geosynchronous orbit.

The disclosed techniques may be implemented to protect a variety of temperature sensitive components from diurnal swings in thermal loads. By way of illustration, the disclosed approach may be used to shield radiators coupled to Low Noise Amplifiers (LNAs). LNAs typically operate optimally at 0 degrees Celsius. In the absence of the presently disclosed techniques, it can be difficult to keep the LNAs at this temperature. However, using the disclosed techniques to reduce the amount of thermal radiation from the Sun and solar arrays reaching the LNA radiator can result in an easier thermal design and/or up to 0.5 dB of performance improvement resulting from lower temperature operation.

In some implementations, the disclosed approach may have incidental benefits. By way of example, the sunshields described above may protect additional components from exposure to solar radiation and/or backflow from solar arrays. For instance, the sunshield may also cast a shadow on a communications panel of the spacecraft, eliminating as much as half the solar load on the communications panel.

Figure 5:
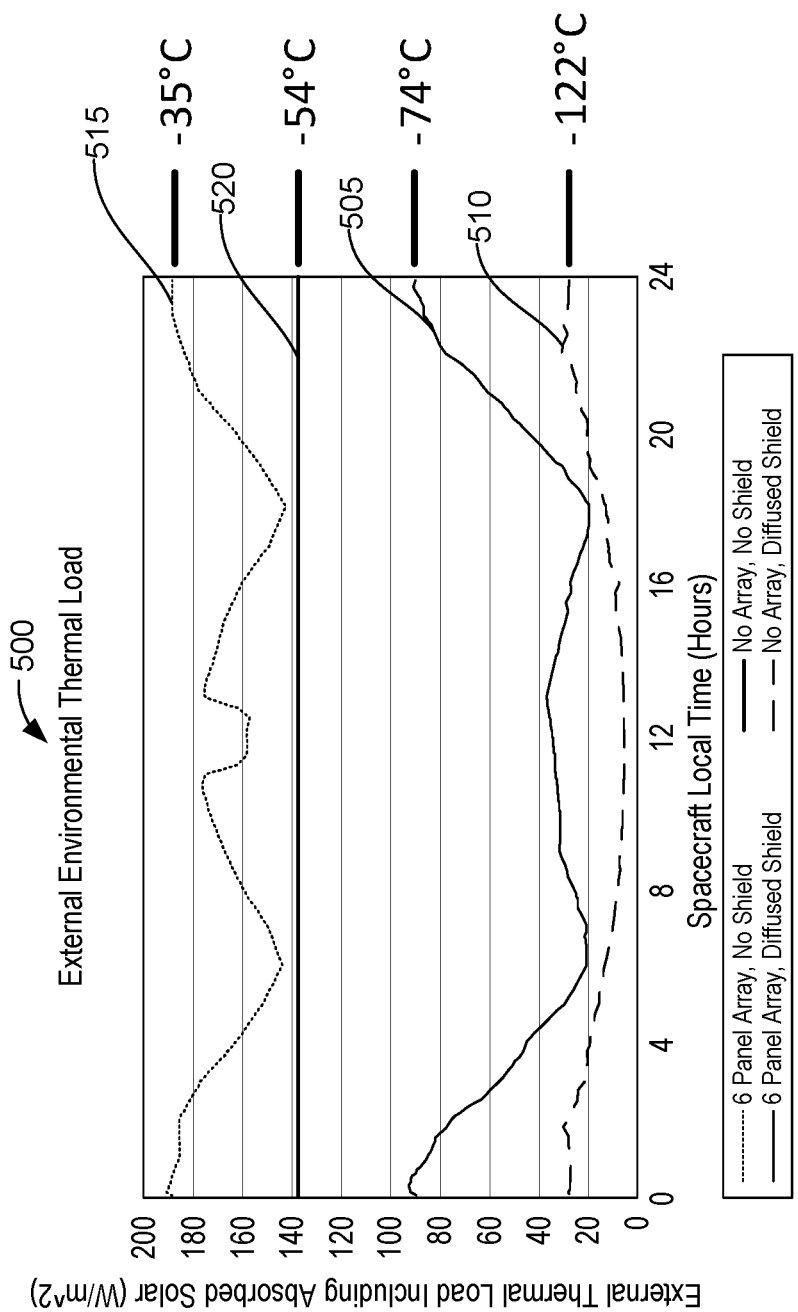
FIG. 5 illustrates an example of a performance graph, in accordance with some implementations.

Reduction in thermal load attributable to the sunshields disclosed herein may be quantified. For example, FIG. 5 illustrates an example of a performance graph 500, in accordance with some implementations. Curve 505 shows the external thermal load absorbed by an imager radiator of a hypothetical spacecraft with two six panel solar arrays and an articulating sunshield, such as the spacecraft 200 of FIG. 2, as a function of time for a typical 24 hour period. Curve 510 shows the external thermal load absorbed by an imager radiator of a hypothetical spacecraft with a single six panel solar array and an articulating sunshield, e.g. if the solar array 230a were removed from the spacecraft 200 of FIG. 2. Curve 515 shows the external thermal load absorbed by an imager radiator of a hypothetical spacecraft with two six panel solar arrays but without an articulating sunshield, e.g. if the sunshield 210 were removed from the spacecraft 200 of FIG. 2. Curve 520 shows the external thermal load absorbed by an imager radiator of a hypothetical spacecraft with a single six panel solar array but without an articulating sunshield, e.g. if both the sunshield 210 and the solar array 230a were removed from the spacecraft 200 of FIG. 2. A comparison of curves 505 and 515 of FIG. 5 demonstrates that the inclusion of the sunshield 210 in the spacecraft 200 of FIG. 2 may result in an average reduction in thermal load absorbed by the radiating surface of the imager radiator 220 of approximately 250 Watts.

Performance graph 500 of FIG. 5 is generated based on a simulation generated by model, which assumes a diffused sunshield. However, the more reflective a sunshield is, the greater the thermal load that can be blocked by the sunshield. It will accordingly be appreciated that even greater benefits than those depicted in FIG. 5 may be realized using the disclosed techniques by ensuring that a surface of a sunshield, e.g., surface 212 of FIG. 2, is as reflective as possible.

Figure 6:
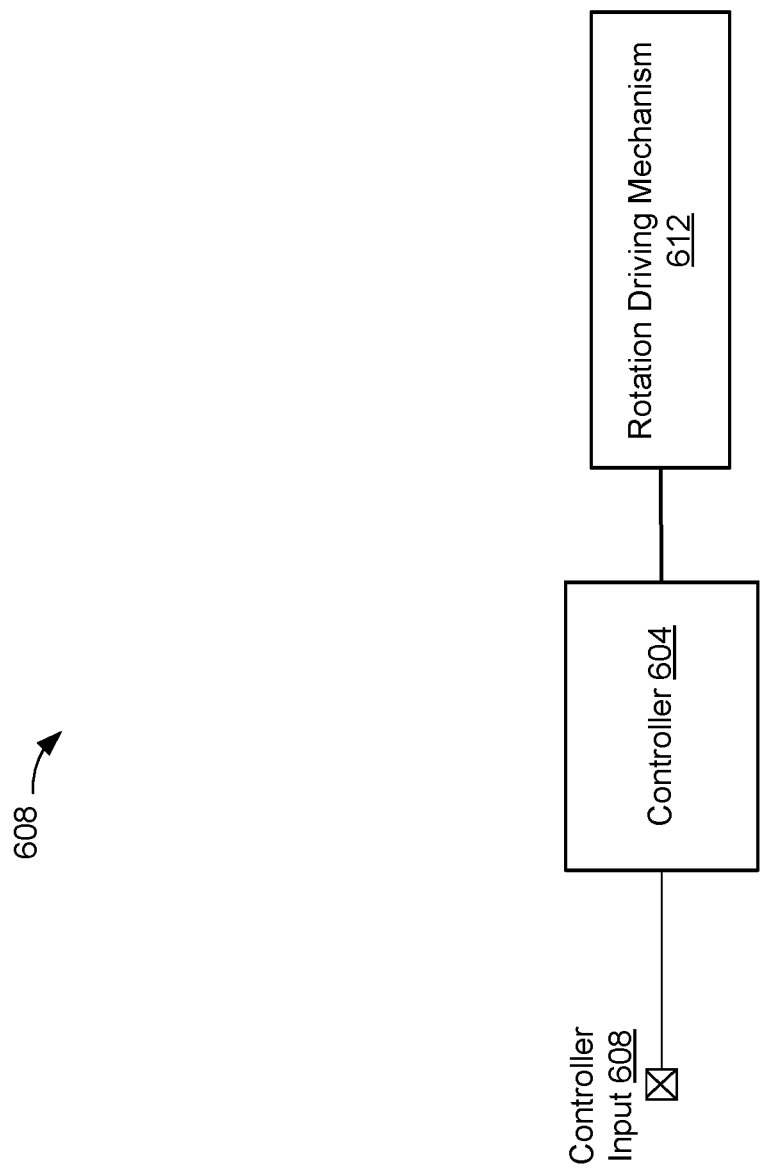
FIG. 6 illustrates an example of a system block diagram of a controller causing articulation of a sunshield of a spacecraft, in accordance with some implementations.

FIG. 6 shows an example of a system block diagram of a controller 604 which may be configured to adjust the position of a sunshield of a spacecraft, e.g. the sunshield 210 of FIGS. 2 and 3.

As an example, controller 604 can receive data on controller input 608 indicating that the sunshield 210 of FIG. 2 should be rotated the axis 240 at a particular rate, such that the sunshield 210 may be positioned to block both the path between the Sun and the radiating surface of the imager radiator 220 as the solar position changes throughout a day.

Figure 7:
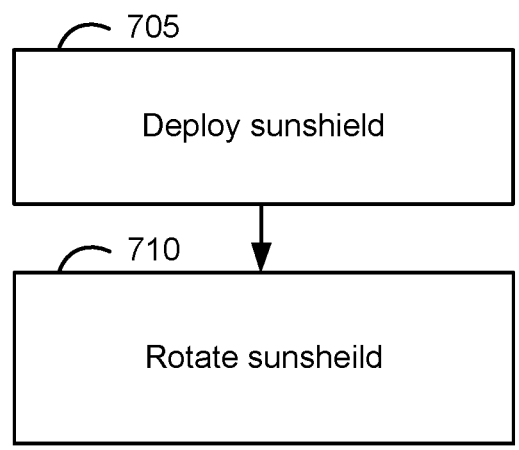
FIG. 7 illustrates an example of a flowchart of a method for causing articulation of a sunshield of a spacecraft, in accordance with some implementations.

FIG. 7 illustrates an example of a flowchart of a method for adjusting an orientation of a sunshield of a spacecraft, in accordance with some implementations. At block 705, a sunshield, e.g., the sunshield 210 of FIG. 2, is deployed. For instance, during deployment, a sunshield may be caused to transition from a launch configuration to an on-orbit configuration. By way of example, as discussed above, the sunshield 410 may be transitioned from the launch configuration depicted in FIG. 4A to the on-orbit configuration depicted in FIG. 4B.

At block 710, a sunshield, e.g., the sunshield 210 of FIG. 2, is rotated. By way of example, controller 604 of FIG. 6 may send a signal to rotation driving mechanism 612 causing the sunshield 210 of FIG. 2 to be rotated from the position depicted in FIG. 2 to the position depicted in FIG. 3.

Referring again to FIGS. 3-5, it will be appreciated that the sunshields disclosed herein, advantageously, decrease the thermal load absorbed by temperature sensitive components.

Thus, improved techniques for reducing thermal load on components of spacecraft have been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A system comprising:
a spacecraft including a controller, a body and an articulable sunshield; wherein, during operation on-orbit:
the spacecraft is disposed in an orbital plane of a geosynchronous orbit of Earth and has (i) a yaw axis within the orbital plane and directed from a spacecraft coordinate system origin toward nadir, (ii) a pitch axis orthogonal to the orbital plane and passing through the spacecraft coordinate system origin, and (iii) a roll axis orthogonal to the pitch axis and the yaw axis and passing through the spacecraft coordinate system origin;
the sunshield is disposed with respect to a selected location of an exterior portion of the body; and
the controller provides control signals to cause:
rotation of the sunshield about an axis that is substantially parallel to and offset from the pitch axis such that the selected location is shaded from the Sun by a surface of the sunshield irrespective of seasonal and diurnal variations in orientation of the spacecraft with respect to the Sun.

2. The system of claim 1, wherein the sunshield is mechanically coupled with a counterweight that rotates with the sunshield such that a center of gravity of the spacecraft remains substantially constant during rotation of the sunshield.

3. The system of claim 1, the controller further configured to provide control signals to cause:
transitioning the sunshield from a launch configuration to an on-orbit configuration, wherein:
in the launch configuration, the surface of the sunshield is substantially parallel to a sidewall of the body, and
in the on-orbit configuration, the surface of the sunshield is substantially orthogonal to the sidewall of the body.

4. The system of claim 1, wherein the selected location includes a radiator of an infra-red imager.

5. The system of claim 1, wherein the selected location includes a low noise amplifier (LNA).

6. The system of claim 1, wherein the spacecraft further comprises a plurality of solar arrays.

7. The system of claim 6, wherein:
each solar array includes 6 panels;
the selected location is disposed on a north-facing or south-facing sidewall of the body, and a maximum daily thermal load absorbed by the selected location does not exceed 95 Watts per meter squared.

8. A method comprising:

operating a spacecraft in an orbital plane of a geosynchronous orbit of Earth, such that the spacecraft has a yaw axis within the orbital plane and directed from a spacecraft coordinate system origin toward nadir, a pitch axis orthogonal to the orbital plane and passing through the spacecraft coordinate system origin, and a roll axis orthogonal to the pitch axis and the yaw axis and passing through the spacecraft coordinate system origin;

deploying a sunshield of the spacecraft such that the sunshield is disposed with respect to a selected location of an exterior portion of the spacecraft; and rotating the sunshield about an axis that is substantially parallel to and offset from the pitch axis to shade the selected location from the Sun by a surface of the sunshield irrespective of seasonal and diurnal variations in orientation of the spacecraft with respect to the Sun.

9. The method of claim 8, wherein the sunshield is mechanically coupled with a counterweight configured to translate during rotation of the sunshield such that a center of gravity of the spacecraft remains substantially constant during rotation of the sunshield.

10. The method of claim 8, the method wherein deploying the sunshield includes transitioning the sunshield from a launch configuration to an on-orbit configuration, wherein:

in the launch configuration, the surface of the sunshield is substantially parallel to a sidewall of the body, and in the on-orbit configuration, the surface of the sunshield is substantially orthogonal to the sidewall of the body.

11. The method of claim 8, wherein the selected location includes a radiator of an infra-red imager.

12. The method of claim 8, wherein the selected location includes a low noise amplifier (LNA).

13. The method of claim 8, wherein the spacecraft further comprises a plurality of solar arrays.

* * * * *